United States Patent
Couillard et al.

(10) Patent No.: US 12,162,246 B2
(45) Date of Patent: Dec. 10, 2024

(54) ASYMMETRICAL GLASS LAMINATES HAVING A TPU INTERLAYER AND RELATED METHODS

(71) Applicant: CORNING INCORPORATED, Corning, NY (US)

(72) Inventors: James Gregory Couillard, Ithaca, NY (US); Michael Aaron McDonald, Painted Post, NY (US); Paul George Rickerl, Endicott, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/777,438

(22) PCT Filed: Nov. 19, 2020

(86) PCT No.: PCT/US2020/061160
§ 371 (c)(1),
(2) Date: May 17, 2022

(87) PCT Pub. No.: WO2021/102069
PCT Pub. Date: May 27, 2021

(65) Prior Publication Data
US 2022/0396055 A1    Dec. 15, 2022

Related U.S. Application Data

(60) Provisional application No. 62/938,704, filed on Nov. 21, 2019.

(51) Int. Cl.
*B32B 17/10* (2006.01)
*B32B 7/12* (2006.01)
(Continued)

(52) U.S. Cl.
CPC ............. *B32B 17/101* (2013.01); *B32B 7/12* (2013.01); *B32B 17/10036* (2013.01);
(Continued)

(58) Field of Classification Search
CPC .... B60J 1/02; B60J 3/007; B32B 3/18; B32B 3/30; B32B 7/02; B32B 7/12;
(Continued)

(56) References Cited

U.S. PATENT DOCUMENTS 6,327,954 B1   12/2001   Medlin
6,576,342 B1   6/2003    Cerf et al.
(Continued)

FOREIGN PATENT DOCUMENTS

CN    1476381 A    2/2004
CN    107614823 A    1/2018
(Continued)

OTHER PUBLICATIONS

Corning (R) Eagle XG (R) glass product information sheet. Obtained from Corning.com on Apr. 5, 2023. (Year: 2021).*
(Continued)

*Primary Examiner* — Megha M Gaitonde
(74) *Attorney, Agent, or Firm* — Daniel J. Greenhalgh

(57) ABSTRACT

Various embodiments for a laminate glass article and related methods are provided. The laminated glass article includes a first glass layer and a second glass layer with a TPU interlayer positioned therebetween.

10 Claims, 5 Drawing Sheets

(51) Int. Cl.
*B32B 27/40* (2006.01)
*C03C 27/10* (2006.01)
*E06B 3/66* (2006.01)

(52) U.S. Cl.
CPC .......... *B32B 17/1077* (2013.01); *B32B 27/40* (2013.01); *C03C 27/10* (2013.01); *B32B 2307/30* (2013.01); *B32B 2307/412* (2013.01); *B32B 2307/732* (2013.01); *E06B 3/66* (2013.01)

(58) Field of Classification Search
CPC .......... B32B 17/10036; B32B 17/1077; B32B 17/101; B32B 17/10119; B32B 27/08; B32B 27/306; B32B 27/40; B32B 2307/212; B32B 2307/402; B32B 2307/412; B32B 2307/54; B32B 2307/732; B32B 2605/00; C03C 27/10; E06B 3/66; Y10T 428/24479; Y10T 428/24612; Y10T 428/24942; Y10T 428/2495; Y10T 428/24959
USPC .................. 428/156, 172, 212, 213, 214
See application file for complete search history.

(56) References Cited

U.S. PATENT DOCUMENTS

| | | |
|---|---|---|
| 2005/0106372 A1 | 5/2005 | Moran et al. |
| 2012/0068083 A1 | 3/2012 | Labrot et al. |
| 2015/0064374 A1 | 3/2015 | Jain et al. |
| 2016/0193812 A1 | 7/2016 | Couillard |
| 2016/0250825 A1* | 9/2016 | Cleary .............. B32B 17/10119 428/215 |
| 2018/0345644 A1 | 12/2018 | Kang et al. |
| 2019/0002328 A1 | 1/2019 | Lezzi et al. |
| 2019/0002330 A1 | 1/2019 | Lezzi et al. |
| 2019/0270284 A1 | 9/2019 | Couillard et al. |
| 2019/0315099 A1 | 10/2019 | Baby et al. |

FOREIGN PATENT DOCUMENTS

| | | |
|---|---|---|
| CN | 108349230 A | 7/2018 |
| JP | 2005-017918 A | 1/2005 |
| JP | 2005-019082 A | 1/2005 |
| KR | 10-1238214 B1 | 3/2013 |

OTHER PUBLICATIONS

International Search Report and Written Opinion of the International Searching Authority; PCT/US2020/061160; mailed on Mar. 18, 2021, 11 pages; Korean Patent Office.
International Search Report and Written Opinion of the International Searching Authority, PCT/US2020/061425; mailed on Mar. 18, 2021, 12 pages; Korean Patent Office.
Chinese Patent Application No. 202080094124.4, Office Action dated Feb. 10, 2023, 4 pages (English Translation), Chinese Patent Office.
ASTM C1172-19, "Standard Specification for Laminated Architectural Flat Glass," Feb. 2019, ASTM International, West Conshohocken, PA, USA, 6 pages.
"Bimetallic strip," Wikipedia, downloaded Dec. 13, 2023, retrieved from https://en.wikipedia.org/w/index.php?title=Bimetallic_strip&oldid=1184098631, 4 pages.
"Circular segment," Wikipedia, downloaded Dec. 13, 2023, retrieved from https://en.wikipedia.org/w/index.php?title=Circular_segment&oldid=1183765080, 4 pages.

* cited by examiner

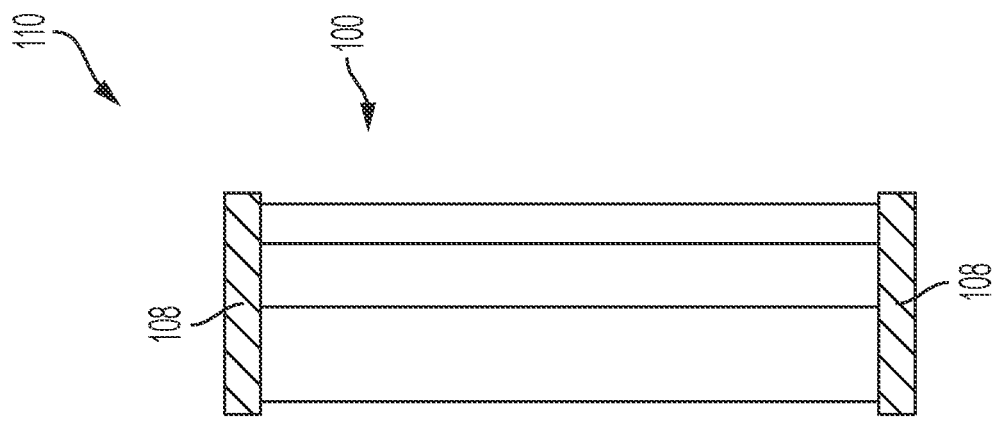
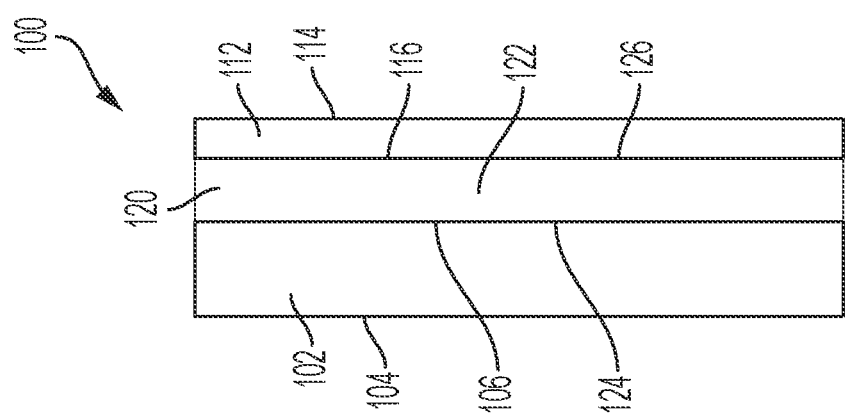

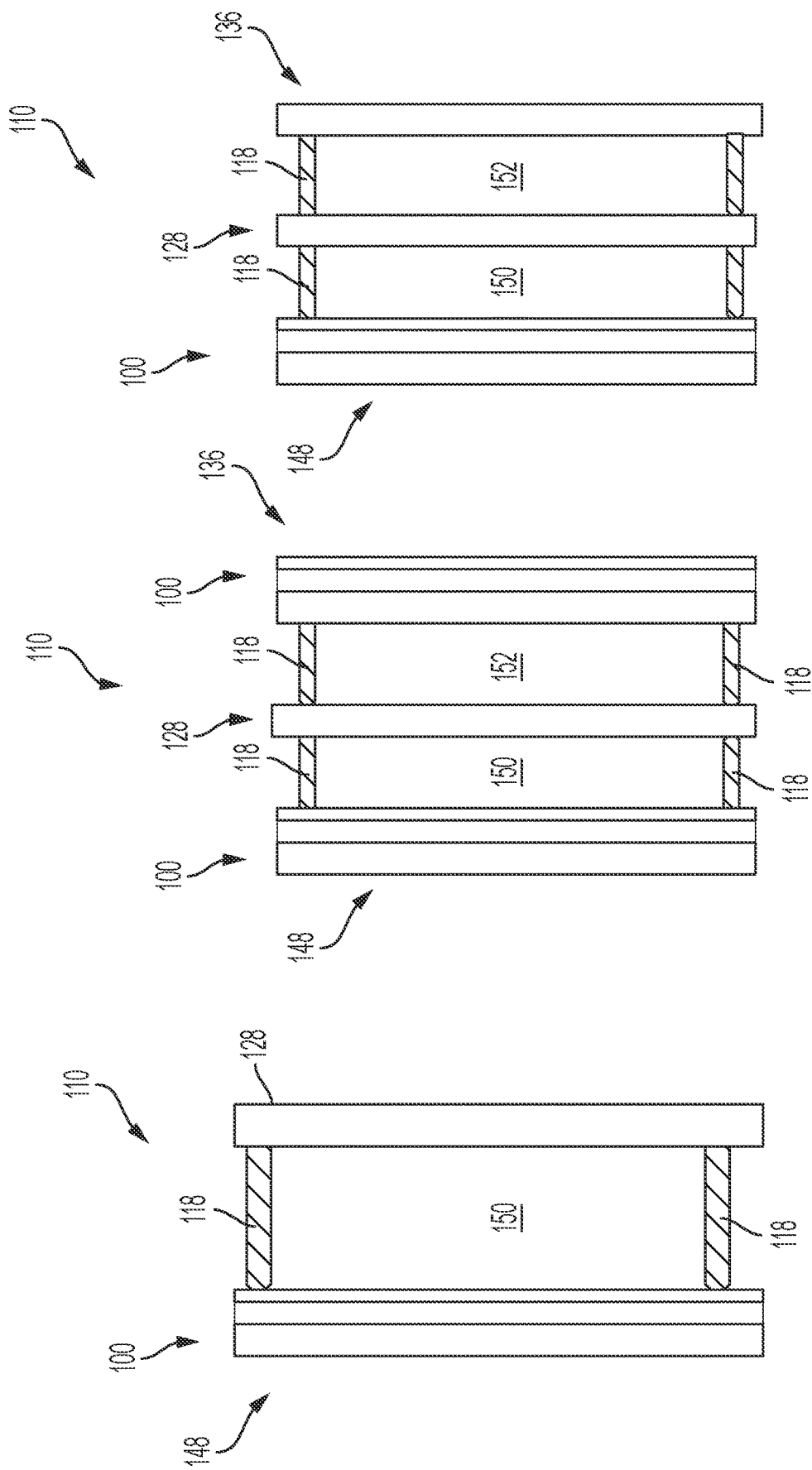

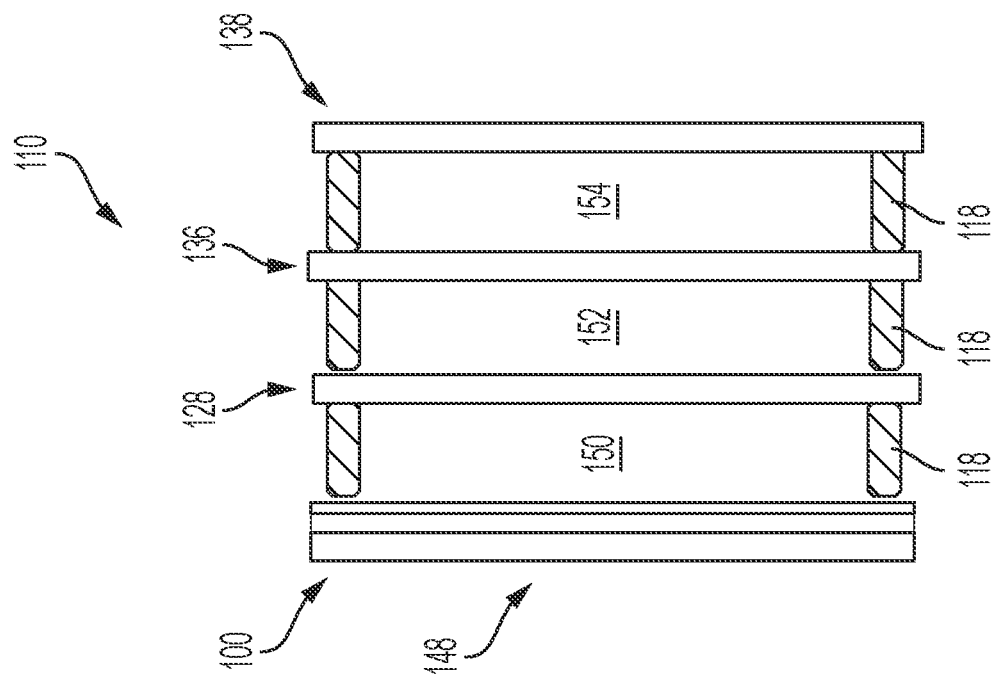
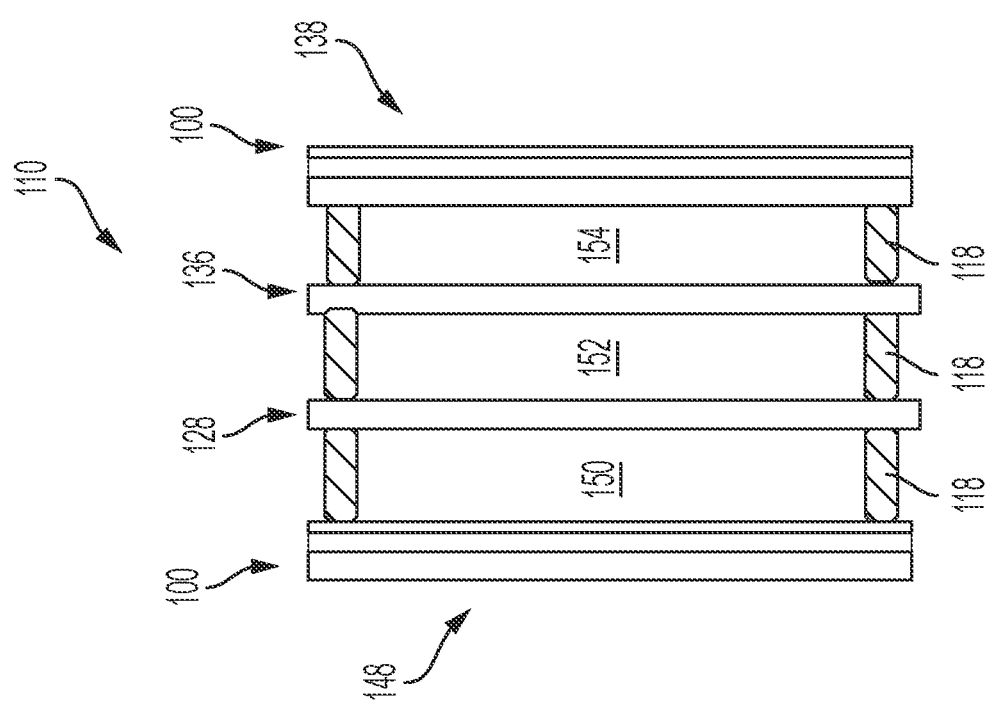

ASYMMETRICAL GLASS LAMINATES HAVING A TPU INTERLAYER AND RELATED METHODS

CROSS REFERENCE TO RELATED APPLICATIONS

This application claims the benefit of priority under 35 U.S.C. § 371 of International Application No. PCT/US2020/061160, filed on Nov. 19, 2020, which claims the benefit of priority under 35 U.S.C. § 119 of U.S. Provisional Application No. 62/938,704 filed Nov. 21, 2019, the content of each of which is incorporated herein by reference in its entirety.

FIELD OF THE INVENTION

Generally, the present disclosure is directed towards various embodiments of asymmetrical laminates with reduced bow. More specifically, the present disclosure is directed towards various embodiments of asymmetrical laminates (e.g. thickness and CTE mismatch) having TPU as the interlayer, wherein the laminate is tailored to mitigate bow (e.g. for large-dimensioned laminates, a surface area at least 3 feet by 5 feet).

Laminates having different glass compositions with differing coefficients of thermal expansion can undergo significant bowing, which makes mounting bowed laminates in planar window frames and insulating glass units impractical or impossible beyond a certain size. Laminates with asymmetrical CTE mismatch and having improved bow resistance are desired.

SUMMARY OF THE INVENTION

Broadly, the present disclosure is directed towards a material combination and method for reducing bow in glass-glass laminates in a laminate, utilized in architectural applications. As disclosed in one or more embodiments, the TPU interlayer provides an advantage with respect to bow reduction/mitigation, which is achieved by utilizing a low-modulus thermoplastic polyurethane (TPU) as an interlayer component of the laminate. With bow reduction/mitigation laminate embodiments detailed herein, the laminates and/or windows are believed to have: improved long-term reliability, improved manufacturability, improved IGU construction, improved performance, wider thickness variation between the two glass sheets of differing CTE, among other advantages.

In one aspect, a laminate glass article is provided. The laminate glass article includes: a first layer of a first transparent or translucent material, the first sheet having a thickness and a first coefficient of thermal expansion (CTE) measured over a range of from 0-300° C.; a second layer of a second transparent or translucent material, the second sheet having a thickness and a second CTE; and a TPU interlayer between the first layer and the second layer.

In one embodiment, the interlayer has a thickness of not greater than 2.5 mm.

In one embodiment, the article has a surface area (e.g. areal size) greater than 3'×5' comprises of bow of not greater than 1.5 mm/m when measured in accordance with ASTM C1172.

In one embodiment, the article has a surface area (e.g. areal size) greater than 3'×5' comprises of bow of not greater than 2.3 mm/m when measured in accordance with ASTM C1172.

In one embodiment, the article has a surface area (e.g. areal surface) greater than 3'×5' comprises of bow of not greater than 3 mm/m when measured in accordance with ASTM C1172.

In one embodiment, the article has a surface area (e.g. areal size) greater than 6'×10' comprises of bow of not greater than 1.5 mm/m when measured in accordance with ASTM C1172.

In one embodiment, the article has a surface area (e.g. areal size) greater than 6'×10' comprises of bow of not greater than 2.3 mm/m when measured in accordance with ASTM C1172.

In one embodiment, the article has a surface area (e.g. areal surface) greater than 6'×10' comprises of bow of not greater than 3 mm/m when measured in accordance with ASTM C1172.

In one embodiment, the article has a surface area (e.g. areal size) greater than 7'×12' comprises of bow of not greater than 1.5 mm/m when measured in accordance with ASTM C1172.

In one embodiment, the article has a surface area (e.g. areal size) greater than 7'×12' comprises of bow of not greater than 2.3 mm/m when measured in accordance with ASTM C1172.

In one embodiment, the article has a surface area (e.g. areal surface) greater than 7'×12' comprises of bow of not greater than 3 mm/m when measured in accordance with ASTM C1172.

In one embodiment, the first CTE is greater than the second CTE.

In one embodiment, the first CTE is 2.5 times greater than the second CTE.

In one embodiment, the first CTE is greater than $75 \times 10^{-7}/° C$.

In one embodiment, the second CTE is less than $60 \times 10^{-7}/° C$.

In one embodiment, the thickness of the first layer is greater than the thickness of the second layer.

In one embodiment, the second layer comprises a thickness of not greater than 1 mm.

In one embodiment, the second layer comprises a thickness in the range from 0.3 mm to 1 mm.

In one embodiment, the first layer is a soda lime silicate glass.

In one embodiment, the second layer is an inorganic glass.

In one embodiment, the second layer is an alkaline earth boro-aluminosilicate glass.

In one embodiment, the interlayer comprises a thickness of 0.76 mm to 2.3 mm.

In one embodiment, a total thickness of the first layer is between 2 mm and 12 mm.

In one embodiment, a total thickness of the first layer is between 3 mm and 6 mm.

In one embodiment, a total thickness of the first layer is between 2 mm and 7 mm.

In one embodiment, the thickness of first layer is not greater than 12 mm, the thickness of second layer not greater than 1 mm, and the thickness of the interlayer not greater than 2.5 mm.

In one embodiment, the thickness of first layer is not greater than 6 mm, the thickness of second layer is not greater than 1 mm, and the thickness of the interlayer is not greater than 2 mm.

In one embodiment, the thickness of the first layer is not greater than 6 mm, the thickness of the second layer is not greater than 1 mm, and the thickness of the interlayer is not greater than 1.5 mm.

In one embodiment, the interlayer thickness ranges from 0.76 mm to 2.5 mm.

In one embodiment, the thickness of the laminate is not greater than 15.3 mm.

In one embodiment, the thickness of the laminate ranges from 4.25 mm to 8 mm.

In one embodiment, the thickness of the laminate is not greater than 6.5 mm.

In one embodiment, the thickness of the laminate ranges from 5 mm to 7 mm.

In one embodiment, the thickness of the laminate is not greater than 4.5 mm.

In one embodiment, the article comprises a large dimensioned size (e.g. surface area) of at least 3'×5'; at least 5'×10'; at least 7'×10'; or at least 6'×12'.

In one embodiment, the article comprises a large dimensioned size (e.g. surface area) of at least 10'×12'.

In one embodiment, the article comprises an architectural product.

In one embodiment, the article comprises a window.

In one embodiment, the article comprises a window, a skylight, a curtain wall, a balcony rail, or an automotive window.

In one embodiment, the article comprises a window including a frame.

In one embodiment, the article comprises a window including a plurality of panes, wherein the plurality of panes are positioned in space relation to one another with a seal member, such that an air gap is defined via the seal member, and the plurality of panes.

In some embodiments, in a triple pane window, the seal between the first pane and the second pane are integral (e.g. the same seal member, same material). In some embodiments, in a triple pane window, the seal between the first pane and the second pane are discrete components. For example, the seals between each set of panes may be of the same material and configuration, or different material and/or configuration.

In some embodiments, in a quadruple pane window, the seal between the first pane and the second pane (e.g. first seal area), the second pane and the third pane (e.g. second seal area), and the third pane and the fourth pane (e.g. third seal area) are integral (e.g. the same seal member). In some embodiments, in a quadruple pane window, the first seal area, the second seal area, and the third seal area comprise discrete components (e.g. separate seal members). Also, when the seal members are discrete seal members, at least one of the seal members is different from the other two, or all three seal members could be different (e.g. based on material and/or configuration).

In one embodiment, the air gap is configured to retain an insulating gas.

In one embodiment, the article comprises a double pane window.

In one embodiment, the double pane window is configured with a laminate.

In one embodiment, the article comprises a double pane window that includes a first laminate as a first pane and a second laminate as a second pane.

In one embodiment, the article comprises a triple pane window.

In one embodiment, the article comprises a triple pane window that includes a first laminate as a first pane, a second pane, and a third pane comprising a second laminate.

In one embodiment, the article comprises a quadruple pane window.

In one embodiment, the article comprises a quadruple pane window that includes a first laminate as a first pane, a second pane, a third pane, and a second laminate comprising a fourth pane.

In another aspect, a method is provided. The method includes the steps of: positioning a TPU interlayer between a first layer of glass and a second layer of glass to form a stack; removing any entrapped air from the respective layers in the stack to form a curable stack; and curing the curable stack at an elevated temperature not exceeding about 105 degrees Celsius to form a monolithic laminate structure.

In one embodiment, the monolithic laminate has a thickness not exceeding 6 mm.

In one embodiment, the monolithic laminate has a thickness not exceeding 15 mm.

In one embodiment, the monolithic laminate has a thickness not exceeding 10 mm.

In one embodiment, the removing step further comprises vacuuming the stack to form a curable stack.

In one embodiment, the removing step further comprises nip rolling the stack to form a curable stack.

In another aspect, a method is provided. The method includes the steps of: configuring an insulating glazing unit (IGU) in a fenestration opening, the insulating glazing unit comprising: at least one pane comprising a laminate glass article, the laminate glass article including: a first layer of a first transparent or translucent material, the first sheet having a first thickness and a first coefficient of thermal expansion (CTE) measured over a range of from 0-300° C.; a second layer of a second transparent or translucent material, the second sheet having a second thickness and a second CTE; a TPU interlayer between the first layer and the second layer, wherein the interlayer is adhered between the first layer and the second layer; and installing the IGU with a frame to provide a window.

In one embodiment, the method comprises, before the installing step, removing a window from a fenestration surface to provide a fenestration opening.

In one embodiment, the IGU has a surface area of at least 3 feet by 5 feet.

In one embodiment, a laminate glass article is provided, comprising: a first layer of a first transparent or translucent material, the first sheet having a first thickness and a first coefficient of thermal expansion (CTE) measured over a range of from 0-300° C. and a first thickness; a second layer of a second transparent or translucent material, the second sheet having a second thickness and a second CTE; and a thermoplastic urethane interlayer (TPU) between the first layer and the second layer, wherein the TPU interlayer is adhered between the first layer and the second layer.

In some embodiments, the interlayer is configured with a low modulus (i.e. Young's modulus E for loading duration 1 min at 20 C). In some embodiments, the interlayer comprises a Young's modulus E of not greater than 7 MPa to not less than 2 MPa. In some embodiments, the interlayer comprises a Young's modulus E of not greater than 5 MPa to not less than 3 MPa. In some embodiments, the interlayer comprises a Young's modulus E of not greater than 5 MPa to not less than 2 MPa. In some embodiments, the interlayer comprises a Young's modulus E of not greater than 5 MPa to not less than 3 MPa.

Additional features and advantages will be set forth in the detailed description which follows and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary and are intended to provide an overview or framework to understanding the nature and character of the disclosure as it is claimed.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following aspects.

BRIEF DESCRIPTION OF THE DRAWINGS

These and other features, aspects and advantages of the present disclosure are better understood when the following detailed description of the disclosure is read with reference to the accompanying drawings, in which:

FIG. 1 is a schematic depicting an embodiment of a laminate, in accordance with various embodiments of the present disclosure.

FIG. 2 is a schematic depicting an embodiment of a single glazing window including a laminate including a frame, in accordance with various embodiments of the present disclosure.

FIG. 3 is a schematic depicting an embodiment of a double pane window including a laminate, in accordance with various embodiments of the present disclosure.

FIG. 4 is a schematic depicting an embodiment of a triple pane window including two laminates, positioned as first pane and third pane, in accordance with various embodiments of the present disclosure.

FIG. 5 is a schematic depicting another embodiment of a triple pane window including a laminate, in accordance with various embodiments of the present disclosure.

FIG. 6 is a schematic depicting an embodiment of a quadruple pane window including two laminates, positioned as first pane and fourth pane, in accordance with various embodiments of the present disclosure.

FIG. 7 is a schematic depicting another embodiment of a quadruple pane window including a laminate, in accordance with various embodiments of the present disclosure.

DETAILED DESCRIPTION OF THE DRAWINGS

Figure 8:
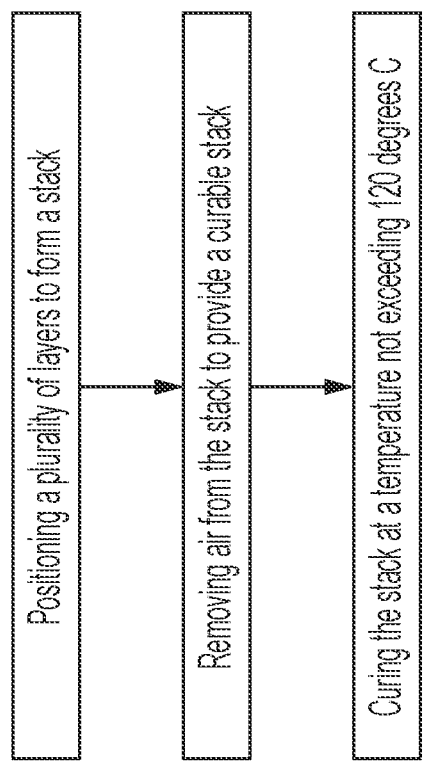
FIG. 8 is a flow chart depicting an embodiment of a method of making a laminate in accordance with various embodiments of the present disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Referring to FIG. 1, a laminate 100 is depicted. The laminate 100 has a first glass layer 102 having a first side 104 and a second side 106 and a second glass layer 112 having a first side 114 and a second side 116. Positioned between the first glass layer 102 and the second glass layer 104 is the interlayer 120, which comprises a TPU layer 122 (having a first side 124 and second side 126). The first side 124 of the TPU layer 122 is positioned adjacent to the second side 106 of the first glass layer 102. The second side 126 of the TPU layer 120 is positioned adjacent to the second side 116 of the second glass layer 112. FIG. 1 depicts a monolithic laminate, in that each of the layers: first glass layer 102, TPU layer 122; and second glass layer 112 are adhered together in an integral form (e.g. optically transparent).

FIG. 2 depicts a laminate 100 having the configuration described in FIG. 1, configured as a window 110. As shown in FIG. 2, the window is a single glazing having a first pane 126 retained (e.g. along its perimetrical edge) in a frame 108.

FIG. 3 depicts a laminate 100 having the configuration described in FIG. 1, configured as a window 110. As shown in FIG. 2, the window is a double pane window having a first pane 148 comprising a laminate 100 and a second pane 128. The first pane 148 is a laminate 100. The first pane 148 and second pane 128 are configured in spaced relation from one another with a seal member 118 configured between the panes (e.g. along or adjacent to a perimetrical edge). In this configuration, an air gap 150 is defined between the seal member 118, first pane 148 and second pane 128. Various gases (e.g. insulating gases) can be configured in the defined air gap 150.

FIG. 4 depicts a laminate 100 having the configuration described in FIG. 1, configured as a window 110. As shown in FIG. 4, the window is a triple pane window having a first pane 148, a second pane 128, and a third pane 136. The first pane 148 is a laminate 100 and the third pane is a laminate. The first pane 148, second pane 128, and third pane 136 are configured in spaced relation from one another with a seal member 118 configured between the panes (e.g. along or adjacent to a perimetrical edge). In this configuration, an air gap 150 is defined between the seal member 118, first pane 148 and second pane 128 and an air gap 152 is defined between the seal member 118, the second pane 128, and the third pane 136. Various gases (e.g. insulating gases) can be configured in the defined air gap 150 and defined air gap 152.

FIG. 5 depicts an alternative embodiment for a triple pane window 100 having a laminate 100 as the first pane 148, where the laminate is as described in FIG. 1 and the triple pane window is as otherwise described in FIG. 4.

FIG. 6 depicts a laminate 100 having the configuration described in FIG. 1, configured as a window 110. As shown in FIG. 6, the window is a quadruple pane window having a first pane 148, a second pane 128, a third pane 136, and a fourth pane 138. The first pane 148 is a laminate 100 and the fourth pane 138 is also configured as a laminate 100. The first pane 148, the second pane 128, the third pane 136, and the fourth pane 138 are configured in spaced relation from one another with a seal member 118 configured between first pane 148 and second pane 128, second pane 128 and third pane 136, and third pane 136 and fourth pane 138 (e.g. along or adjacent to a perimetrical edge). In this configuration, an air gap 150 is defined between the seal member 118, first pane 148 and second pane 128; an air gap 152 is defined between the seal member 118, the second pane 126, and the third pane 136; and an air gap 154 is defined between the seal member 118, the third pane 136 and the fourth pane 138. Various gases (e.g. insulating gases) can be configured in the defined air gap 150, the defined air gap 152, and the air gap 154.

FIG. 7 depicts an alternative embodiment for a quadruple pane window 100 having a laminate 100 as the first pane 148, where the laminate is as described in FIG. 1 and the quadruple pane window is as otherwise described in FIG. 6.

FIG. 8 provides an example method of making a laminate, in which a plurality of layers are configured together in adjacent relation to form a stack; removing air from the stack to form a curable stack; and curing the stack at a low temperature (e.g. less than 130 degrees C., less than 120 degrees C., less than 110 degrees C., or at 100 degrees C.).

Figure 9:
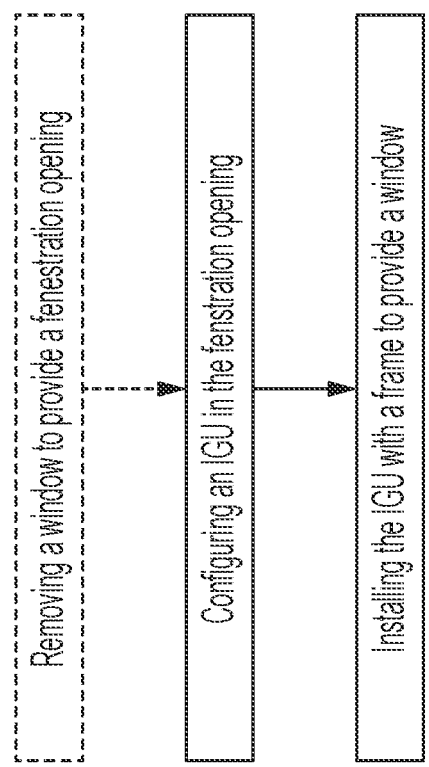
FIG. 9 is a flow chart depicting a method of installing a window having a laminate, in accordance with various embodiments of the present disclosure.

FIG. 9 provides an example method of installing a window in accordance with one or more embodiments set forth herein, including configuring the IGU (window) in a fenestration opening and installing the IGU with a frame to provide an installed window. Also set out in FIG. 9 is the option for retrofit installation, in which the existing window is removed from a building to provide a fenestration opening, leaving an opening for the new window installation.

Example: Evaluation of Laminate Construction and Bow Measurement

In order to evaluate the interlayer configuration's effect on bow mitigation, an experiment was performed where two (2) laminates were constructed and bow in the resulting laminate was measured in two directions: (1) in the diagonal across the laminate and (2) along the long edge of the laminate.

An embodiment having TPU as the interlayer was evaluated against a Control having polyvinyl butyral (PVB) as the interlayer. The experiment utilized uniform thicknesses for various components: the first layer (soda lime glass) had a thickness of 2.1 mm, the second layer (an alkaline earth boro-aluminosilicate glass) had a thickness of 0.7 mm; and the respective interlayer having an equal thickness (embodiment vs. control).

The same method of lamination was utilized to process all samples, in that the interlayer was positioned between the two layers of glass. Air was removed via vacuum (other acceptable methods of air removal include nip rolling). Then, the interlayer was cured at elevated temperature.

The resulting laminates, each had the same dimension of 1100×900 mm, were evaluated for bow (1) in the diagonal across the laminate and (2) along the long edge of the laminate.

Bow was measured in accordance with ASTM C1172. More specifically, each sample was placed in a free-standing vertical position, with the longest edge resting on blocks at the quarter points. With the laminate in this position, a straightedge is then placed across the concave surface, parallel to and within 1 in. (25.4 mm) of the edge, and the maximum deviation was measured with a dial indicator (long edge bow). With the laminate in this position, a straightedge is then placed across the concave surface, from generally opposing corners across the diagonal of the sample, and the maximum deviation was measured with a dial indicator (diagonal bow).

The table below provides the resulting bow measurements for each of the laminates.

| Sample Description | First layer Thickness, mm | Interlayer Type/ Thickness (mm) | Second layer Thickness, (mm) | Post-Lam Diagonal Bow (mm) | Post-Lam Long Edge Bow (mm) | % Bow decrease vs. Control (avg. bow reduction vs. control) |
|---|---|---|---|---|---|---|
| Control (non-invention) | 2.1 | PVB/ 2.29 | 0.7 | 4.58 | 4.23 | Control, N/A |
| Embodiment | 2.1 | TPU 2.29 | 0.7 | 0.84 | 0.80 | 81.4% |

As shown in the table above, the embodiment significantly outperformed the control. Under identical processing conditions, the embodiment demonstrated over five times less bow compared with an approximately equal thickness of PVB. In evaluating the average bow, the bow was calculated to be over an 80% decrease from that of the control, a significant improvement.

Many variations and modifications may be made to the above-described embodiments of the disclosure without departing substantially from the spirit and various principles of the disclosure. All such modifications and variations are intended to be included herein within the scope of this disclosure and protected by the following claims

REFERENCE NUMBERS

Window 110 (e.g. also called an insulating glazing unit)
Frame 108
Seal member(s) 118
First pane 148
Second pane 128
Third pane 136
Fourth pane 138
Air gap 1 150
Air gap 2 152
Air gap 3 154
Laminate 100
First glass layer 102 (e.g. high CTE, thicker, SLG)
First side of first glass layer 104
Second side of first glass layer 106
Second glass layer 112 (e.g. low CTE, thinner, non-SLG)
First side of second glass layer 114
Second side of second glass layer 116
interlayer 120
TPU layer 122
First side of first TPU layer 124
Second side of first TPU layer 126

The invention claimed is:

1. A laminate glass article, comprising:
a first layer of a first transparent or translucent material, the first layer having a first coefficient of thermal expansion (CTE) measured over a range of from 0-300° C.;

a second layer of a second transparent or translucent material, the second layer having a second CTE; and an interlayer between the first layer and the second layer, wherein the interlayer is adhered between the first layer and the second layer and comprises an interlayer thickness, wherein the first layer is a soda lime silicate glass and the second layer is an alkaline earth boro-aluminosilicate glass, wherein the first layer has a thickness from at least 2 mm to no greater than 3 mm, wherein the second layer has a thickness from 0.3 mm to 1 mm, wherein the laminate glass article has dimensions of at least 1100 mm×900 mm and each of a long-edge bow and a diagonal bow of no greater than 1.5 mm when measured in accordance with ASTM C1172 in an as-laminated condition, wherein the interlayer comprises thermoplastic urethane and is configured with a Young's modulus (E) of not greater than 7 MPa to not less than 2 MPa, wherein the interlayer thickness ranges from at least 1.5 mm to no greater than 2.5 mm, and wherein the thickness of the laminate glass article ranges from 5 mm to 7 mm.

2. The article of claim 1, wherein the first CTE is greater than the second CTE.

3. The article of claim 1, wherein the first CTE is 2.5 times greater than the second CTE.

4. The article of claim 1, wherein the first CTE is greater than $75\times10^{-7}$/° C.

5. The article of claim 1, wherein the second CTE is less than $60\times10^{-7}$/° C.

6. The article of claim 1, wherein the thickness of the first layer is greater than the thickness of the second layer.

7. The article of claim 1, wherein the interlayer comprises a thickness of no greater than 2.3 mm.

8. The laminate glass article of claim 1, wherein the laminate glass article has dimensions of at least 5' (1524 mm)×10' (2540 mm).

9. A window, comprising:

a laminate glass article, and a frame retaining the laminate glass article, wherein the laminate glass article comprises:

a first layer of a first transparent or translucent material, the first layer having a first coefficient of thermal expansion (CTE) measured over a range of from 0-300° C.;

a second layer of a second transparent or translucent material, the second layer having a second CTE; and an interlayer between the first layer and the second layer, wherein the interlayer is adhered between the first layer and the second layer and comprises an interlayer thickness, wherein the first layer is a soda lime silicate glass and the second layer is an alkaline earth boro-aluminosilicate glass, wherein the first layer has a thickness from at least 2 mm to no greater than 3 mm, wherein the second layer has a thickness from 0.3 mm to 1 mm, wherein the laminate glass article has dimensions of at least 1100 mm×900 mm and each of a long-edge bow and a diagonal bow of no greater than 1.5 mm when measured in accordance with ASTM C1172 in an as laminated condition, wherein the interlayer comprises thermoplastic urethane and is configured with a Young's modulus (E) of not greater than 7 MPa to not less than 2 MPa, wherein the interlayer thickness ranges from at least 1.5 mm to no greater than 2.5 mm, and wherein the thickness of the laminate glass article ranges from 5 mm to 7 mm.

10. The laminate glass article of claim 9, wherein the laminate glass article has dimensions of at least 5' (1524 mm)×10' (2540 mm).

* * * * *